United States Patent
Tajima et al.

(10) Patent No.: US 6,428,214 B2
(45) Date of Patent: Aug. 6, 2002

(54) WHEEL BEARING UNIT

(75) Inventors: Eiji Tajima; Akira Torii, both of Shizuoka-ken (JP)

(73) Assignee: NTN Corporation, Osaka (JP)

( * ) Notice: Subject to any disclaimer, the term of this patent is extended or adjusted under 35 U.S.C. 154(b) by 48 days.

(21) Appl. No.: 09/725,505

(22) Filed: Nov. 30, 2000

(30) Foreign Application Priority Data

Jan. 11, 2000 (JP) .................................. 2000-002339

(51) Int. Cl.⁷ ......................... F16C 13/00; F16C 27/00; F16C 33/58; F16C 35/14
(52) U.S. Cl. ............ 384/544; 29/898.063; 29/898.066; 384/516; 384/506; 384/448; 451/52
(58) Field of Search ................ 384/544, 499, 384/500, 504, 505, 506, 448, 510, 512, 513, 515, 516, 537, 545, 543, 584, 585, 589, 622, 490; 29/898.066, 898.062, 898.063, 898.061; 451/52; 280/124.125, 103, 105; 464/906, 132

(56) References Cited

U.S. PATENT DOCUMENTS

| | | | | |
|---|---|---|---|---|
| 3,879,897 A | * | 4/1975 | Kato | |
| 4,369,603 A | * | 1/1983 | Gebal et al. | ................... 451/52 |
| 4,788,758 A | * | 12/1988 | Gordon et al. | |
| 5,458,352 A | * | 10/1995 | Lederman | ................... 384/544 |
| 5,507,094 A | * | 4/1996 | Lederman | ............... 29/898.061 |
| 5,564,839 A | * | 10/1996 | Ouchi et al. | ................. 384/448 |
| 5,692,590 A | * | 12/1997 | Iihara et al. | ................. 464/906 |
| 5,772,494 A | * | 6/1998 | Muraki et al. | .................. 451/52 |
| 6,146,022 A | * | 11/2000 | Sahashi et al. | ............. 384/544 |
| 6,254,276 B1 | * | 7/2001 | Ouchi et al. | ................. 384/448 |
| 6,318,897 B1 | * | 11/2001 | Shitsukawa et al. | |
| 2001/0012416 A1 | * | 8/2001 | Greiner | |

FOREIGN PATENT DOCUMENTS

| | | | |
|---|---|---|---|
| DE | 2916120 | * | 10/1979 |
| JP | 55150953 | * | 11/1980 |
| JP | 3196936 | * | 8/1991 |

* cited by examiner

Primary Examiner—Douglas C. Butler
(74) Attorney, Agent, or Firm—Arent Fox Kintner Plotkin & Kahn

(57) ABSTRACT

A wheel bearing unit is with an outer race member having two rows of raceway surfaces formed in its inner peripheral surface. In the vicinity of the groove bottom portion of the raceway surface of an inner race member is provided a projection having a diameter greater than the inscribed circle diameter. The raceway surface, the outer peripheral surface of the projection, and smaller end face are concurrently ground to keep within a predetermined range of standard values the radius difference between the diameter of the groove bottom portion of the raceway surface of the inner race member and the outer diameter of the projection, as well as the core deviation between the groove bottom portion and the smaller end face.

12 Claims, 6 Drawing Sheets

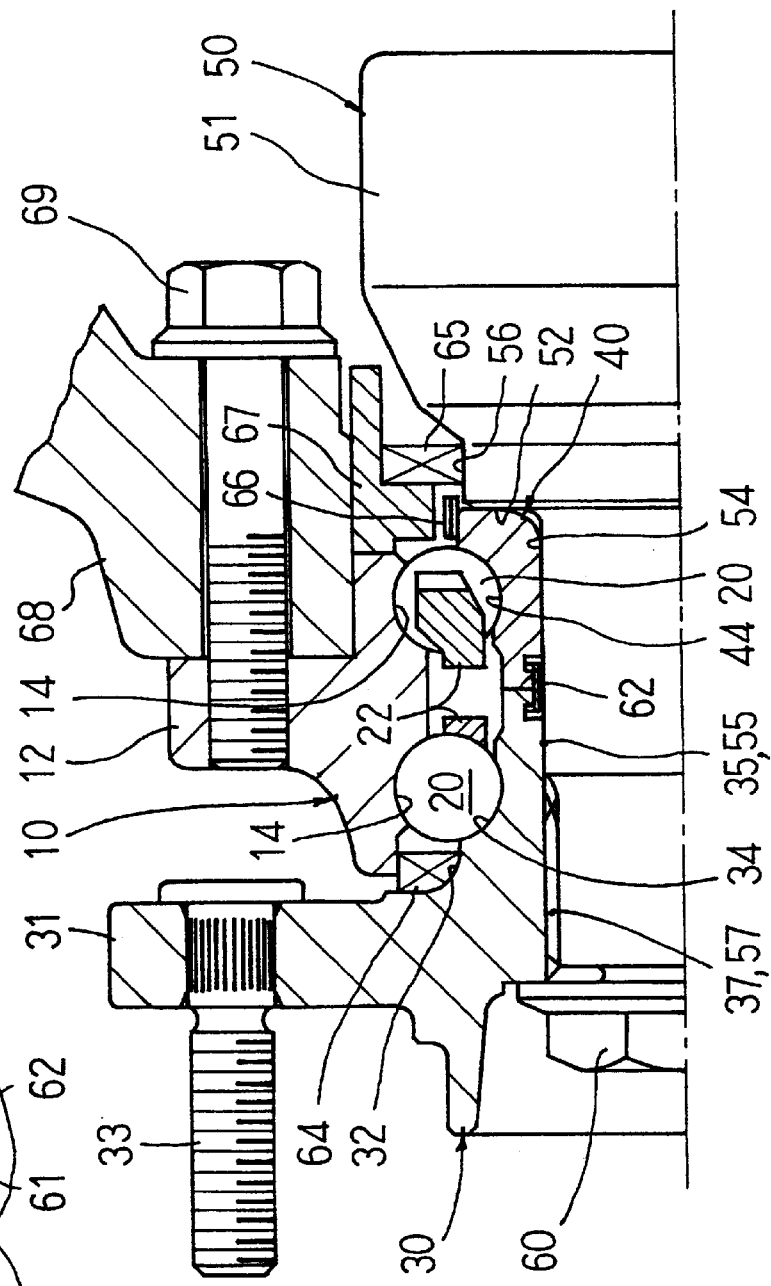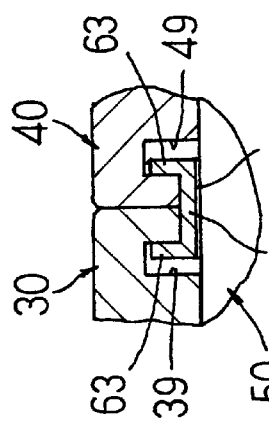

WHEEL BEARING UNIT

BACKGROUND OF THE INVENTION

1. Field of the Invention

The present invention relates to a wheel bearing unit for supporting a car wheel of a motor vehicle, and more particularly to a wheel bearing unit for use in a driving wheel that is composed of a combination of a wheel bearing and a constant velocity universal joint acting as a unit.

2. Description of the Related Art

FIG. 5 illustrates the structure of a conventional example of a wheel bearing unit that is composed of a combination of a wheel bearing 1 and a constant velocity universal joint 7 acting as a unit. The wheel bearing 1 is composed of an outer race member 2 which is attached to the body of a motor vehicle, and an inner race member 4 which is rotatably supported through two rows of balls 3 by the outer race member 2. The inner race member 4 is composed of two separate components, of which one is a hub wheel 5 provided with a flange used for mounting of a car wheel and the other is an inner ring 6 engaged with the hub wheel 5.

In the inner race member 4, raceway surfaces 4a and 4b are provided in the hub wheel 5 and the inner ring 6, respectively, so as to face two rows of raceway surfaces 2a and 2b of the outer race member 2, respectively.

The inner ring 6, which is provided with the raceway surface 4b serving as an inner raceway surface as seen from the cross direction of the vehicle, i.e., an inboard raceway surface, is press-fitted to the cylindrical end portion of the hub wheel 5, and therefore it never occurs that the components constituting the wheel bearing 1 are inadvertently disassembled before being assembled into the vehicle, for example, during shipment. Note that, here, one of the shoulders of the raceway groove hasis removed. In the inner ring 6 thus constructed, the outer diameter of the smaller end face is equal to or smaller than the groove-bottom diameter of the raceway groove.

The wheel bearing unit shown in FIG. 5 is constructed in such a manner that the inner ring 6 is first engaged with the hub wheel 5, and the hub wheel 5 is thereafter engaged with the constant velocity universal joint 7. That is, this wheel bearing unit adopts the so-called double engagement construction. Accordingly, the hub wheel 5 tends to have an unduly great wall thickness. If the hub wheel 5 and the inner ring 6 are directly engaged with the constant velocity universal joint 7, respectively, it is possible to reduce the wall thickness of the hub wheel 5 and thereby make it light-weight, or increase the diameter of the spline portion. In this case, however, the hub wheel 5 and the inner ring 6 need to be realized as separate components. This requires that extra measures be taken to prevent the inner ring 6 and the balls 3 from being disassembled inadvertently during shipment, for example, before the separate components are assembled into the constant velocity universal joint 7.

With regard to the above-described matter, for example, in the publication of Japanese Utility Model Application No. Sho 63-180721 a technique to prevent components from being disassembled during shipment is proposed. According to this technique, as shown in FIG. 6A, a cage 8 has a projection 8a formed so as to protrude therefrom in the direction of the internal diameter thereof. The projection 8a is fitted into a groove 9a formed in an inner ring 9. Moreover, as one of commonly-used ball bearings, as shown in FIG. 6B, a construction is known in which a pair of inner rings a are kept non-separable by providing a projection a2 in the vicinity of the groove bottom portion of each inner ring a. In these conventional examples, however, the raceway surface a1, the projection a2, and the smaller end face a3 are separately ground, and therefore the following problem arises.

That is, a radius difference $\delta$ between a diameter $d1$ of the groove bottom portion of the raceway surface a1 and an outer diameter $d2$ of the projection a2 is equal to an mount of interference required when the inner ring a is assembled in its axial direction. A tolerance of the mount of interference is equal to a sum of a tolerance of the diameter $d1$ of the groove bottom portion and a tolerance of the outer diameter $d2$ of the projection a2. Therefore, several tens of $\mu$m is required for the tolerance of the amount of interference $\delta$. Thus, a variation in the amount of interference $\delta$ is so large that there is a great possibility that a pressurized imprint is adversely planted on a ball b. Therefore, it is. necessary to apply heat to an outer ring c to increase the inscribed circle diameter to assemble the inner wheel a. Moreover, a tolerance of a core deviation determining an axialinternal clearance, i.e., the distance between the groove bottom portion and the smaller end face a3, is equal to a sum of a tolerance of the raceway surface a1 and a tolerance of the smaller end face a3. Therefore, if the raceway surface a1 and the smaller end face a3 are separately ground, the tolerance of the core deviation becomes excessively large. Several tens of $\mu$m is also required for this tolerance of the core deviation. For this reason, it is not possible to reduce the initial axial gap to a small value, or if the initial axial gap is reduced forcibly, it is necessary to employ a selective assembly method (matching).

SUMMARY OF THE INVENTION

The present invention has been conducted in view of the above-discussed problems observed in conventional wheel bearing units. It is an object of the present invention to provide an improved wheel bearing unit in which the set value of the amount of interference is kept constant and a preload variation is satisfactorily suppressed by minimizing the set value of the initial axial gap.

To achieve the above object, a wheel bearing unit according to the present invention comprises:

an outer. race member having two rows of raceway surfaces formed in its inner peripheral surface, the outer race member being attached to the body of a motor vehicle; and an inner race member provided with a wheel mounting flange, the inner race member being rotatably supported through two rows of balls by the outer race member, wherein the inner race member has a projection formed in the vicinity of the groove bottom portion of its raceway surface, the projection having a diameter greater than the inscribed circle diameter, and wherein, in the inner race member, the raceway surface, the outer peripheral surface of the projection, and the smaller end face are concurrently ground to keep within the range of predetermined values the radius difference between the diameter of the groove bottom portion of the raceway surface of the inner race member and the outer diameter of the projection, as well as the core deviation between the groove bottom portion of the raceway surface and the smaller end face.

In this construction, by concurrently grinding the raceway surface, the outer peripheral surface of the projection, and the smaller end face, not only it is possible to reduce the number of man-hours required, but it is also possible to satisfactorily suppress variations in tolerances. This, helps make the range of preload variation narrower. Moreover, at the time. when the raceway surface, the outer peripheral surface of the projection, and the smaller end face are concurrently ground, the shoulder portion (in the inner ring) and the sealing land (in the hub wheel) may be additionally ground concurrently. By doing so, the sealing land of the hub wheel or the outer peripheral surface of the shoulder portion of the inner ring is realized as a ground surface free from lead burrs or tool marks extending circumferentially, and this leads to an improvement of sealability.

According to an embodiment of the invention, in the inner race member, the highest value of the tolerance of the radius difference between the diameter of the groove bottom portion of the raceway surface and the outer diameter of the projection, and the same of the core deviation between the groove bottom portion of the raceway surface and the smaller end face are respectively limited to 20 $\mu$m, and more preferably, 10 $\mu$m.

The inner race member may be composed of a hub wheel having a wheel mounting flange formed integrally therein, and an inner ring provided separately from the hub wheel. In this construction, the hub wheel has a raceway surface formed so as to face one of two rows of the raceway surfaces of the outer race member, and the inner ring has a raceway surface formed so as to face the other of two rows of the raceway surfaces of the outer race member.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3A is a sectional view illustrating another embodiment of the wheel bearing unit according to the present invention.

FIG. 3B is an enlarged view of the coupling ring part shown in FIG. 3A.

DETAILED DESCRIPTION OF THE PREFERRED EMBODIMENTS

Figure 1:
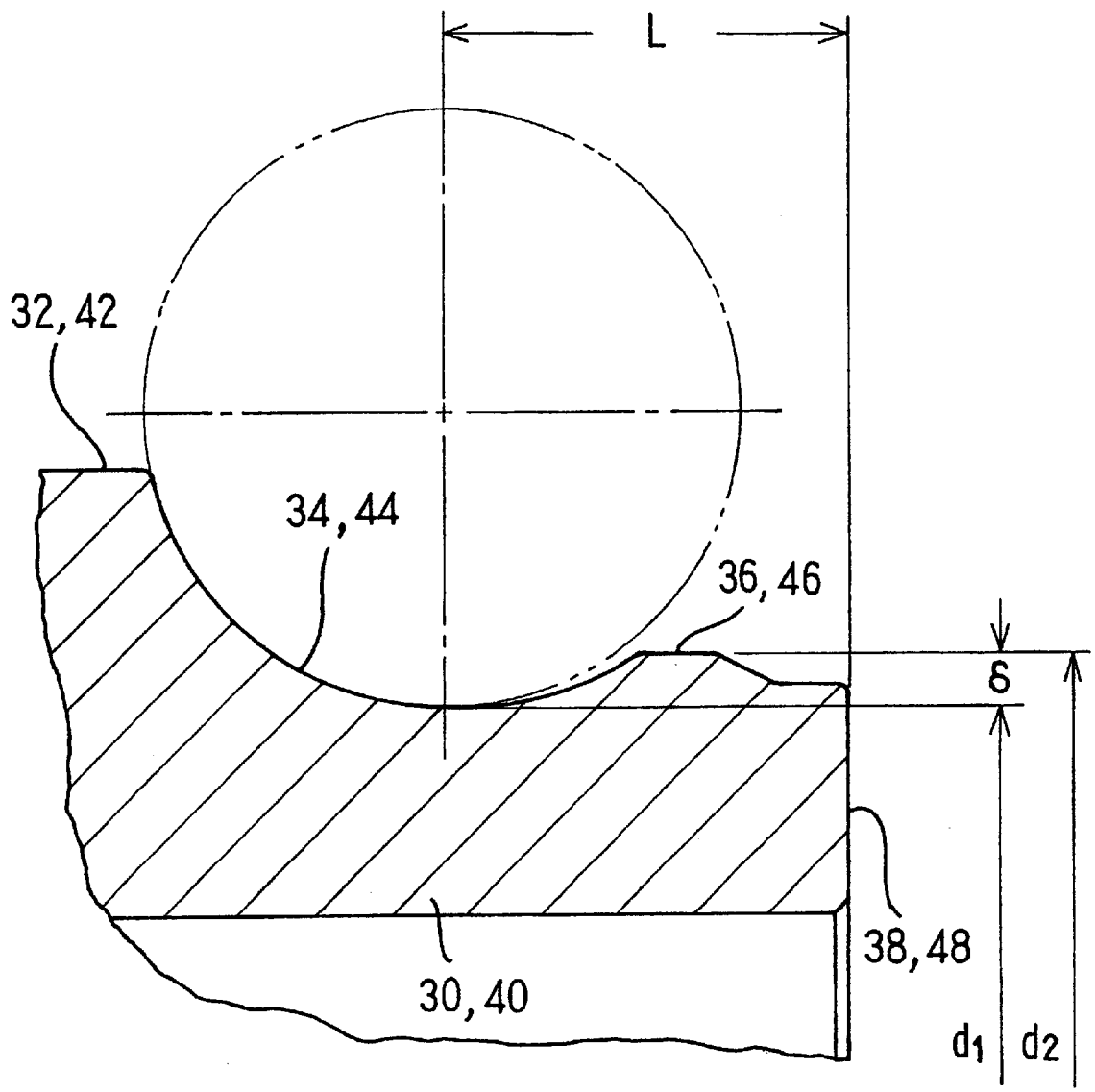
FIG. 1 is an enlarged sectional view illustrating the principal portion of an inner race member.

Hereinafter, embodiments of the present invention employed in a wheel bearing unit will be described with reference to FIGS. 2 and 3. The wheel bearing unit of the embodiment consists of a wheel bearing and a constant velocity universal joint. The wheel bearing is composed of an outer race member 10, an inner race member (30 and 40), and two rows of balls 20 interposed between the outer and inner race members.

On the outer peripheral surface of the outer race member 10 is integrally formed a flange 12. The outer race member 10 is secured at the flange 12 to a knuckle 68 of a suspension system with a bolt 69. On the inner peripheral surface of the outer race member 10 are formed two rows of raceway surfaces 14.

The inner race member consists of a hub wheel 30 and an inner ring 40. In the inner race member, the raceway surfaces 34 and 44 are provided in the hub wheel 30 and the inner ring 40, respectively, so as to face two rows of the raceway surfaces 14 of the outer race member 10, respectively. The inner race member is rotatably supported through the balls 20 by the outer race member 10.

The hub wheel 30 has a flange 31 used for mounting of a car wheel (a wheel mounting flange) formed integrally on its outer peripheral surface. At circumferentially equally divided positions in the flange 31 are studded hub bolts 33. The portion extending from the base end portion of the flange 31 through the raceway surface 34 serves as a sealing land 32 which a sealing lip of a seal 64 is slidably contact. The inner ring 40, which is separate from the hub wheel 30, has only one shoulder of the raceway groove the other removed.

The inner race member (30 and 40) is coupled to an outer joint member 50 of the constant velocity universal joint. The hub wheel 30 is provided with a through hole what includes an engagement portion 35 and a spline hole portion 37. The hub wheel 30 is in engagement at the engagement portion 35 with an engagement portion 55 of a stem portion of the outer joint member 50, and is spline-engaged at the spline hole portion 37 with a spline shaft portion 57 of the stem portion of the outer joint member 50. The inner ring 40 is in engagement with an engagement portion 54 of the stem portion of the outer joint member 50. Note that the other components than the outer joint member 50 constituting the constant velocity universal joint, such as an inner joint member, balls, and a cage, are omitted in the figure.

A method of joining with or without using screw is used for joining the wheel bearing and the constant velocity universal joint together in the axial direction. Clinching or staking the stem end or the hub wheel is a method of joining without using screw. The wheel bearing unit shown in FIG. 2 adopts the mechanical fastening with screw. Specifically, in this construction, the inner ring 40 is press-fitted to the engagement portion 54 of the stem portion of the outer joint member 50 so that a larger end face 41 (see FIG. 4) is abutted against a shoulder face 52 of the outer joint member 50. Subsequently, the hub wheel 30 is press-fitted to the stem portion of the outer joint member 50 so that a smaller end face 38 (see FIG. 1) is abutted against a smaller end face 48 (see FIG. 1) of the inner ring 40. Then, a bolt 60 is screwed through a screw hole 58 formed at the end of the stem portion of the outer joint member 50. As a result, the inner race member (30 and 40) and the outer joint member 50 are secured to each other, and the wheel bearing and the constant velocity universal joint are accordingly combined together so as to act as a unit.

Figure 2:
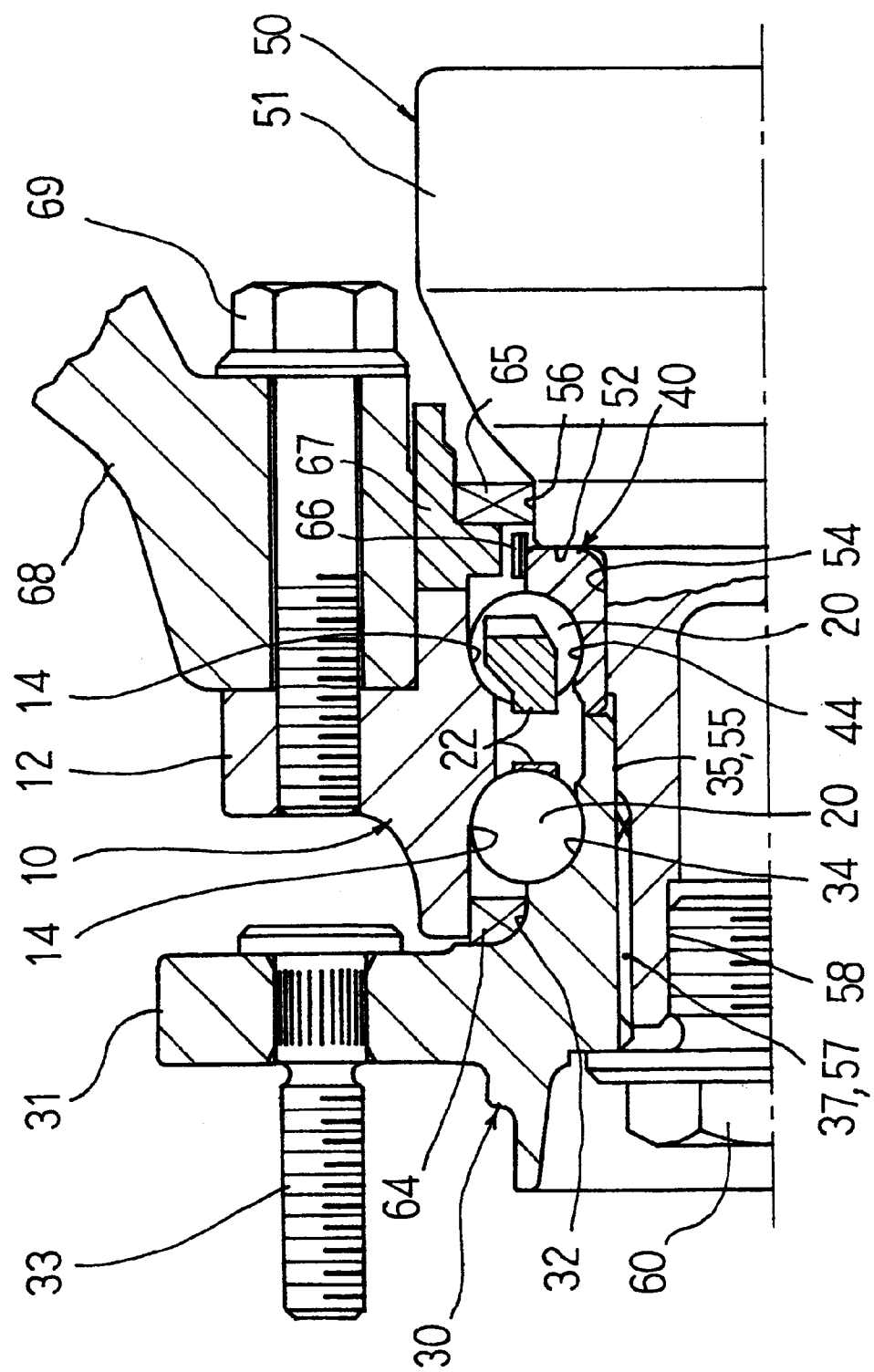
FIG. 2 is a sectional view illustrating an embodiment of the wheel bearing unit according to the present invention.

Note that, in the wheel bearing unit of the embodiment shown in FIG. 2, the hub wheel 30 and the inner ring 40, which are independent of each other, are merely disposed end to end. Thus, when the bolt 60 is removed to pull the wheel bearing out of the outer joint member 50, it is inevitable that the inner ring 40 and the balls 20 lying on the raceway surface 44 thereof remain on the outer joint member 50. If the hub wheel 30 and the inner ring 40 are completely separated in this way, the internal parts of the bearing are left exposed, and are thus likely to be subjected to the accidental intrusion of foreign material or to suffer from scratches and flaws on the balls or raceway surfaces. This is highly undesirable. To avoid this, the wheel bearing unit of the embodiment shown in FIG. 2 needs to be taken care of as a non-separation type in which the hub wheel 30 and the inner ring 40 are kept unseparable. Therefore, in this embodiment, the clinching or staking may be employed instead of the screw fixing method as shown in the figure to join the wheel bearing and the constant velocity universal joint together.

On the other hand, in the wheel bearing unit of another embodiment of the present invention shown in FIG. 3A and 3B, a hub wheel 30 and an inner ring 40 are coupled together by a coupling ring 62. The coupling ring 62 includes a ring shaped body 61 with radially outwardly extending rims 63 formed on opposite ends thereof. With this, the hub wheel 30 and the inner ring 40 are combined into a single unit in such a way that the two rims 63 of the coupling ring 62 are fitted into annular grooves 39 and 49, respectively, that are formed in the inner peripheral surfaces of the hub wheel 30 and the inner ring 40, respectively. In the wheel bearing unit of this embodiment, when the hub wheel 30 is pulled out of the outer joint member 50, the inner ring 40 is also pulled out thereof at the same time. This construction enables the entire wheel bearing including the inner ring 40 to be completely detached from the constant velocity universal joint (separation-type).

Next, FIG. 1 is a diagram showing the dimensions of the components around the raceway surface of the inner race member (the hub wheel 30 or the inner ring 40). In the hub wheel 30, a radius difference δ between the diameter d1 of the groove bottom portion of the raceway surface 34 and the outer diameter d2 of the projection 36 defines an amount of interference. A distance L between the groove bottom portion of the raceway surface 34 and the smaller end face 38 is called a core deviation. In the inner ring 40, a radius difference δ between the diameter d1 of the groove bottom portion of the raceway surface 44 and the outer diameter d2 of the projection 46 defines an amount of interference. Here, a distance L between the groove bottom portion of the raceway surface 44 and the smaller end face 48 is called a core deviation.

Figure 4:
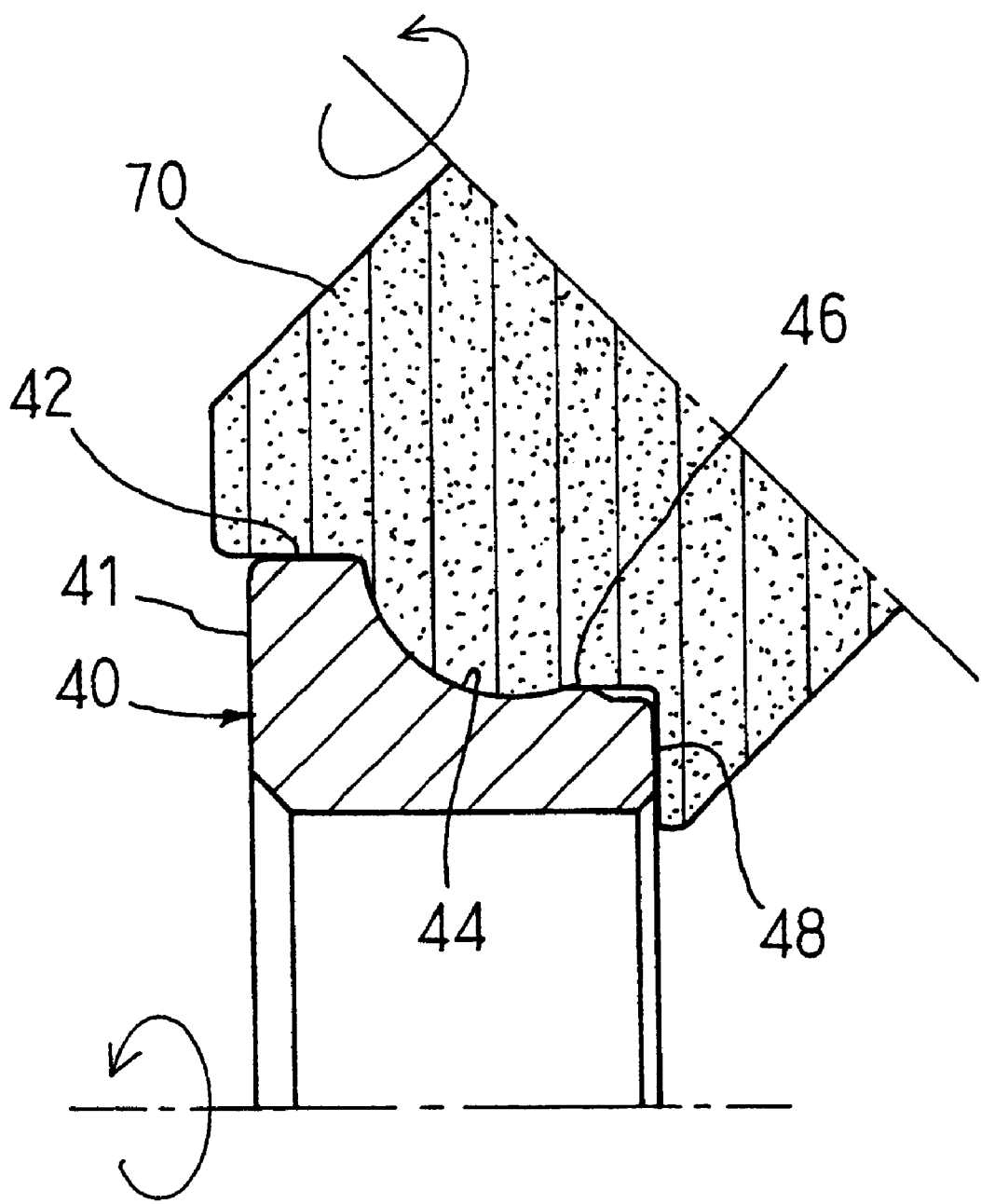
FIG. 4 is a view of assistance in explaining the process of grinding on the inner wheel employed in the present invention.
Figure 5:
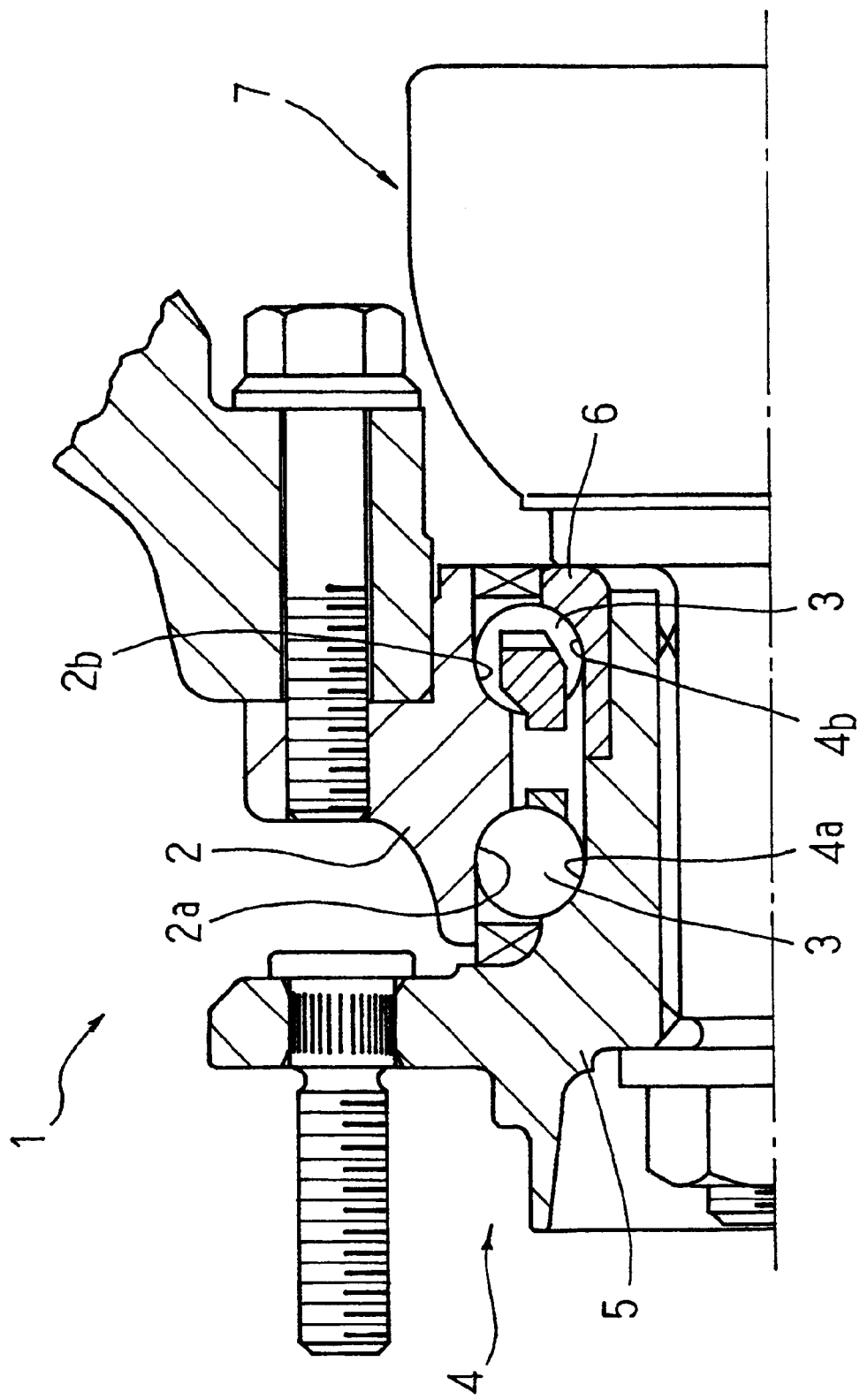
FIG. 5 is a sectional view illustrating the structure of a conventional wheel bearing unit.
Figure 6A:
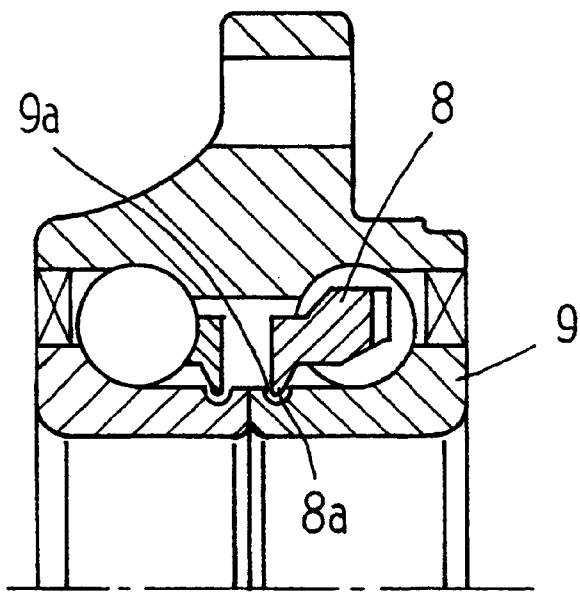
FIGS. 6A and 6B are sectional views of assistance in explaining the techniques adopted in conventional wheel bearing units.
Figure 6B:
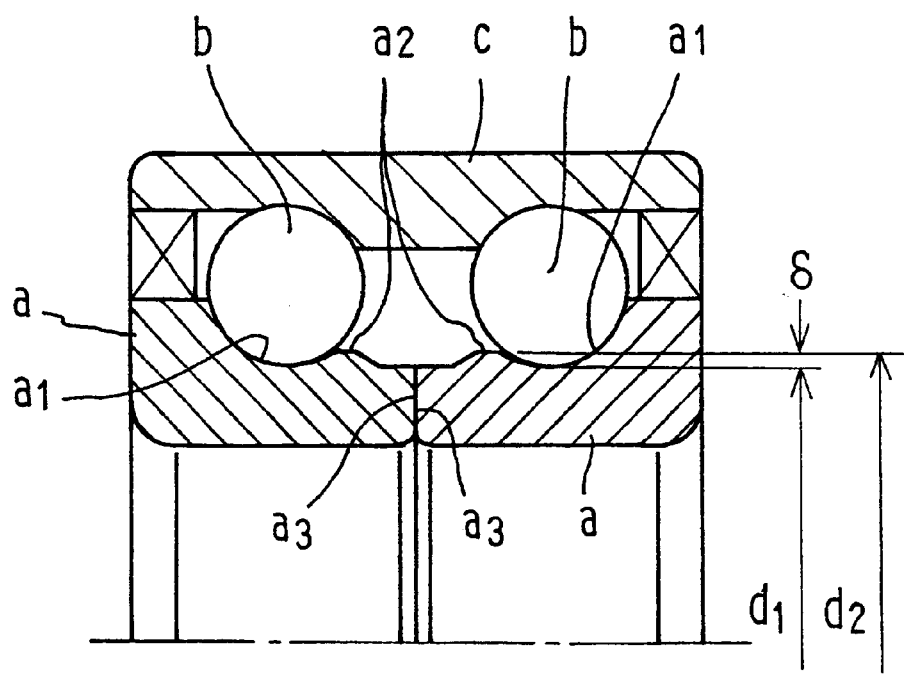

FIG. 4 is a view of assistance in explaining the process of grinding on the inner ring 40. By using a formed grinding wheel 70, the sectional profile of which is shown in the figure, the outer peripheral surface of the shoulder portion 42 of the inner wheel 40, the raceway surface 44, the outer peripheral surface of the projection 46, and the smaller end face 48 are ground concurrently. Such a method is effective in minimizing variations in dimensions among the parts described just above. In this way, it is possible to reduce the tolerance of the radius difference between the diameter of the groove bottom portion of the raceway surface 44 of the inner wheel 40 and the outer diameter of the projection 46, i.e., the amount of interference δ, as well as the tolerance of the core deviation between the groove bottom portion of the raceway surface and the smaller end face, to no more than 20 μm. Here, by employing an angular feed grinding method, it is possible to achieve an improvement in the grindability. Although the above description deals only with the inner ring 40, the same applies also to the hub wheel 30.

Moreover, in the hub wheel 30, the sealing land 32 is ground based on a plunge grinding method and is thus free from tool marks extending circumferentially on the ground surface, i.e., lead burrs. This achieves an improvement in the sealability. Meanwhile, in the inner ring 40, the outer peripheral surface of the shoulder portion 42 is plunge ground and is thus free from tool marks lead burrs extending circumferentially on the ground surface. Also here, an improvement in the sealability is achieved as long as the ground surface functions as a sealing land. That is, in the wheel bearing unit shown in FIG. 2, the inner ring 40 has a pulsar ring 66 attached to its shoulder portion 42, and a wheel velocity sensor 67 is arranged therein so as to face this pulsar ring 66. Moreover, the sealing land 56, with which the sealing lip of the seal 65 comes slidable contact, is formed on the outer joint member 50. However, in this construction, it is also possible to arrange the pulsar ring 66 and the wheel velocity sensor 67 in different positions therein so that the seal 65 comes in slidable contact with the outer peripheral surface of the shoulder portion 42 of the inner wheel 40. In this case, the outer peripheral surface 42 of the shoulder portion 42 serves as a sealing land.

As described heretofore, according to the present invention, a wheel bearing unit is composed of an outer race member and an inner race member. The outer race member has two rows of raceway surfaces formed in its inner peripheral surface and is attached to the body of a motor vehicle. The inner race member is provided with a wheel mounting flange, and is rotatably supported through two rows of balls by the outer race member. In this construction, in the vicinity of the bottom portion of the raceway surface of the inner race member is provided a projection having a diameter greater than the inscribed circle diameter. Moreover, in the inner race member, by concurrently grinding the raceway surface, the outer peripheral surface of the projection, and the smaller end face, it is possible to keep within a predetermined range of standard values the radius difference between the diameter of the groove bottom portion of the raceway surface of the inner race member and the outer diameter of the projection, as well as the core deviation between the groove bottom portion of the raceway surface and the smaller end face. This helps minimize the set value of the initial axial clearance and decrease the preload variation.

Moreover, it is possible to keep constant the set value of the amount of interference and thus achieve an improvement in the assembly efficiency. Furthermore, unlike conventional constructions, it is not necessary to apply heat to the outer race member. Thus, there is no need to employ extra equipment therefor. It is needless to say that the number of man-hours required is successfully reduced.

At the time when the raceway surface, the outer peripheral surface of the projection, and the smaller end face are concurrently ground, if the sealing land (the sealing land in the hub wheel, or the shoulder portion of the inner ring) is additionally ground concurrently, it is possible to minimize the coaxiality between the sealing land and the raceway surface, and thus achieve an improvement in the sealability.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A wheel bearing unit comprising:
   an outer race member having two rows of raceway surfaces formed in its inner peripheral surface, the outer race member being attached to a body of a motor vehicle; and
   an inner race member provided with a wheel mounting flange, the inner race member being rotatably supported through two rows of balls by the outer race member, wherein the inner race member has a projection formed in vicinity of a groove bottom portion of its raceway surface, the projection having a diameter greater than an inscribed circle diameter, and wherein, in the inner race member, the raceway surface, an outer peripheral surface of the projection, and a smaller end face are concurrently ground to keep within a predetermined range of standard values a radius difference between a diameter of a groove bottom portion of the raceway surface of the inner race member and an outer diameter of the projection, as well as a core deviation between a groove bottom portion of the raceway surface and the smaller end face.

2. A wheel bearing unit as claimed in claim 1, wherein a highest value of a tolerance of the radius difference between the diameter of the groove bottom portion of the raceway surface of the inner race member and the outer diameter of the projection is limited to 20 $\mu$m.

3. A wheel bearing unit as claimed in claim 1, wherein a highest value of a tolerance of the core deviation between the groove bottom portion of the raceway surface of the inner race member and the smaller end face is limited to 20 $\mu$m.

4. A wheel bearing unit as claimed in claim 1,
wherein the inner race member further comprising:
a hub wheel having a wheel mounting flange formed integrally therein; and
an inner ring provided separately from the hub wheel,
wherein the hub wheel has a raceway surface formed so as to face one of two rows of the raceway surfaces of the outer race member, and the inner ring has a raceway surface formed so as to face the other of two rows of the raceway surfaces of the outer race member.

5. A wheel bearing unit as claimed in claim 4, wherein an outer peripheral surface of a shoulder portion of the inner wheel is realized as a ground surface free from lead burrs.

6. A wheel bearing unit as claimed in claim 4, wherein the hub wheel has a sealing land formed so as to extend from a base end portion of the flange through the raceway surface, the sealing land being realized as a ground surface free from lead burrs.

7. A wheel bearing unit as claimed in claim 2,
wherein the inner race member further comprising:
a hub wheel having a wheel mounting flange formed integrally therein; and
an inner ring provided separately from the hub wheel,
wherein the hub wheel has a raceway surface formed so as to face one of two rows of the raceway surfaces of the outer race member, and the inner ring has a raceway surface formed so as to face the other of two rows of the raceway surfaces of the outer race member.

8. A wheel bearing unit as claimed in claim 7, wherein an outer peripheral surface of a shoulder portion of the inner wheel is realized as a ground surface free from lead burrs.

9. A wheel bearing unit as claimed in claim 7, wherein the hub wheel has a sealing land formed so as to extend from a base end portion of the flange through the raceway surface, the sealing land being realized as a ground surface free from lead burrs.

10. A wheel bearing unit as claimed in claim 3,
wherein the inner race member further comprising:
a hub wheel having a wheel mounting flange formed integrally therein; and
an inner ring provided separately from the hub wheel,
wherein the hub wheel has a raceway surface formed so as to face one of two rows of the raceway surfaces of the outer race member, and the inner ring has a raceway surface formed so as to face the other of two rows of the raceway surfaces of the outer race member.

11. A wheel bearing unit as claimed in claim 10, wherein an outer peripheral surface of a shoulder portion of the inner wheel is realized as a ground surface free from lead burrs.

12. A wheel bearing unit as claimed in claim 10, wherein the hub wheel has a sealing land formed so as to extend from a base end portion of the flange through the raceway surface, the sealing land being realized as a ground surface free from lead burrs.

* * * * *